(12) United States Patent
Alquier et al.

(10) Patent No.: US 9,410,433 B2
(45) Date of Patent: Aug. 9, 2016

(54) INTER-BLADE SEALING FOR A TURBINE OR COMPRESSOR WHEEL OF A TURBINE ENGINE

(75) Inventors: Damien Alquier, Paris (FR); Jacques Auguste Amedee Boury, Saint Ouen en Brie (FR); Pascal Courtin, Sannois (FR); Huu-Thanh Tran, Persan (FR)

(73) Assignee: SNECMA, Paris (FR)

( * ) Notice: Subject to any disclaimer, the term of this patent is extended or adjusted under 35 U.S.C. 154(b) by 594 days.

(21) Appl. No.: 13/812,035

(22) PCT Filed: Jul. 20, 2011

(86) PCT No.: PCT/FR2011/051752
§ 371 (c)(1),
(2), (4) Date: Jan. 24, 2013

(87) PCT Pub. No.: WO2012/013892
PCT Pub. Date: Feb. 2, 2012

(65) Prior Publication Data
US 2013/0121810 A1    May 16, 2013

(30) Foreign Application Priority Data
Jul. 27, 2010   (FR) .................................... 10 56153

(51) Int. Cl.
*F01D 11/00* (2006.01)
*F01D 5/12* (2006.01)
*F01D 5/24* (2006.01)

(52) U.S. Cl.
CPC .. *F01D 5/12* (2013.01); *F01D 5/24* (2013.01); *F01D 11/006* (2013.01); *F05D 2250/231* (2013.01); *Y02T 50/672* (2013.01)

(58) Field of Classification Search
CPC ........... F01D 5/12; F01D 5/24; F01D 11/006; F01D 11/008; F05D 2250/231
USPC ......................................................... 416/190
See application file for complete search history.

(56) References Cited

U.S. PATENT DOCUMENTS

| 4,872,812 | A | 10/1989 | Hendley et al. | |
|---|---|---|---|---|
| 7,021,898 | B2 * | 4/2006 | Elliott et al. | 416/193 A |
| 7,163,376 | B2 * | 1/2007 | Itzel | F01D 5/16 416/193 A |
| 7,252,477 | B2 * | 8/2007 | Tomita et al. | 416/193 A |
| 2005/0186074 | A1 | 8/2005 | Tomita et al. | |
| 2006/0110255 | A1 | 5/2006 | Itzel et al. | |
| 2008/0181779 | A1 * | 7/2008 | Decardenas | 416/219 R |
| 2009/0097980 | A1 * | 4/2009 | Hayasaka et al. | 416/189 |

FOREIGN PATENT DOCUMENTS

| FR | 2 619 158 | 2/1989 |
|---|---|---|
| JP | 7 305602 | 11/1995 |

OTHER PUBLICATIONS

International Search Report Issued Oct. 5, 2011 in PCT/FR11/51752 Filed Jul. 20, 2011.

* cited by examiner

Primary Examiner — Nathaniel Wiehe
Assistant Examiner — Michael Sehn
(74) Attorney, Agent, or Firm — Oblon, McClelland, Maier & Neustadt, L.L.P

(57) ABSTRACT

An inter-blade sealing for a turbine or compressor wheel of a turbine engine includes inserts engaged in longitudinal cavities in side edges of platforms of blades and bearing, in operation, against facing side edges of platforms of adjacent blades. Each insert has a cylindrical elongate shape and includes in its outer cylindrical surface at least one annular groove for passing platform cooling air.

9 Claims, 2 Drawing Sheets

INTER-BLADE SEALING FOR A TURBINE OR COMPRESSOR WHEEL OF A TURBINE ENGINE

BACKGROUND OF THE INVENTION

1. Field of the Invention

The present invention relates to a compressor or turbine wheel for a turbine engine such as an airplane turboprop or turbojet, the wheel including inter-blade sealing means.

2. Description of the Related Art

A compressor or turbine wheel of a turbine engine comprises a disk that includes slots in its periphery for engaging blade roots, these roots being connected to the airfoils of the blades via platforms that are generally of parallelepiped shape and that, when in the mounted position on the disk, are spaced apart from one another by small amounts of clearance in the circumferential direction.

A fraction of the flow of air for ventilating the blades penetrates into the spaces situated between the roots of the blades and it needs to be prevented from passing through the above-mentioned clearance between the platforms of the blades radially from the inside towards the outside by means of inter-blade sealing systems mounted between the platforms or the roots of the blades.

In the prior art, each inter-blade sealing system comprises a sheet metal box that is held captive radially on the inside of the platforms of two adjacent blades, between the tangs of the blades.

The major drawback of that sealing system is that it does not enable the platforms of the blades to be cooled (so cracks might appear thereon) and therefore serves merely to provide inter-blade sealing and possibly also to damp any vibration to which the blades are subjected in operation. Furthermore, that system does not allow blades to be mounted on the disk and removed from the disk independently of one another.

Proposals have already been made to mount an insert of triangular section between the side edges of the platforms of two adjacent blades.

Nevertheless, that solution is not entirely satisfactory since the insert can become worn in operation, and its wear is not uniform since it has three different bearing faces that may be subjected to wear. Furthermore, the wear is not quantifiable, e.g. during a maintenance operation.

BRIEF SUMMARY OF THE INVENTION

A particular object of the invention is to provide a solution to this problem that is simple, effective, and inexpensive.

To this end, the invention provides a turbine or compressor wheel for a turbine engine, the wheel including inter-blade sealing means, the sealing means comprising inserts, each for engaging in a longitudinal cavity in a side edge of a platform of a blade and for bearing in operation against the facing side edge of a platform of an adjacent blade, each insert being in the form of an elongate cylinder and having at least one annular groove in its outer cylindrical surface for passing air for cooling the platforms of the blades, the wheel being characterized in that the insert includes at least one annular score in its outer cylindrical surface forming a wear indicator and of depth that is less than the depth of the or each annular groove for passing cooling air.

The insert of the invention has a single bearing surface that is likely to be subjected to friction wear, namely its outer cylindrical surface. In operation, the insert can adopt any position about its own longitudinal axis, thereby encouraging its wear to be uniformly distributed over its entire cylindrical surface.

The insert of the invention is more stable than a prior art insert of triangular section that needs to become angularly positioned in operation, thereby limiting wear of the insert of the invention as a result of friction. Furthermore, it is easier and less expensive to make and its cooling groove(s) may be made simply by machining. Furthermore, the insert allows the blades to be removed individually, which is not true when using the boxes of the prior art.

The insert has one or more annular grooves for passing cooling air that are formed in its outer cylindrical surface. In operation, it is subjected to centrifugal forces and it comes to bear against the radially outer wall of the cavity and against the edge of the platforms of the adjacent blade. A calibrated flow of cooling air can pass between the platforms and the insert through the groove(s) of the insert in order to cool the edges of the platforms locally. The position and the dimensions of the or each groove of the insert make it possible to control platform cooling accurately.

By way of example, the insert may have one, two, or three annular grooves for passing platform cooling air.

The insert of the invention also includes one or more wear indicators, each of which is formed by an annular score in the outer cylindrical surface of the insert. These wear indicators enable an operator to determine, during a maintenance operation, whether the insert is worn excessively and therefore needs to be changed.

The depth of the or each score forming a wear indicator is determined as a function of the amount of wear that is acceptable for the insert, i.e. the amount of wear beyond which it no longer provides good sealing between the platforms of the blades. Thus, an operator who observes that the wear indicators are no longer visible while performing a maintenance operation needs to replace the insert. The wear indicators of the insert thus facilitate maintenance.

The insert may include an annular score forming a wear indicator in the vicinity of each of its ends.

According to another characteristic of the invention, the or each annular score forming a wear indicator is of a depth that is less than the depth of the or each annular groove for passing cooling air.

In a particular embodiment of the invention, the insert has a diameter of about 2 millimeters (mm) to 3 mm and a length of about 20 mm to 40 mm. The or each annular groove may have a width of about 0.5 mm and a depth of about 0.6 mm, and the or each wear annular score may have a width of about 0.2 mm and a depth of about 0.2 mm.

By way of example, the insert of the invention may be made of a metal alloy, such as of Inconel®, or of a ceramic matrix composite material.

The turbine or compressor wheel of the invention comprises a disk carrying blades, each blade having a root engaged in a slot of complementary shape in the periphery of the disk, a platform that connects the root to the airfoil of the blade and that includes two substantially parallel side edges, and is characterized in that the side edge of the platform extending beside the pressure side of the airfoil of each blade includes a longitudinal cavity for receiving an above-mentioned insert.

Preferably, the cavity for receiving the sealing system has a U-shaped or V-shaped section at its longitudinal ends, the open side of the U- or V-shaped section facing towards the adjacent blade, the radially inner side wall of said cavity extending substantially parallel to the platform and its radially outer side wall being inclined relative to the platform and extending radially outwards beside the adjacent blade.

BRIEF DESCRIPTION OF THE SEVERAL VIEWS OF THE DRAWINGS

The invention can be better understood and other details, characteristics, and advantages of the present invention appear more clearly on reading the following description made by way of non-limiting example and with reference to the accompanying drawings, in which.

DETAILED DESCRIPTION OF THE INVENTION

Figure 1:
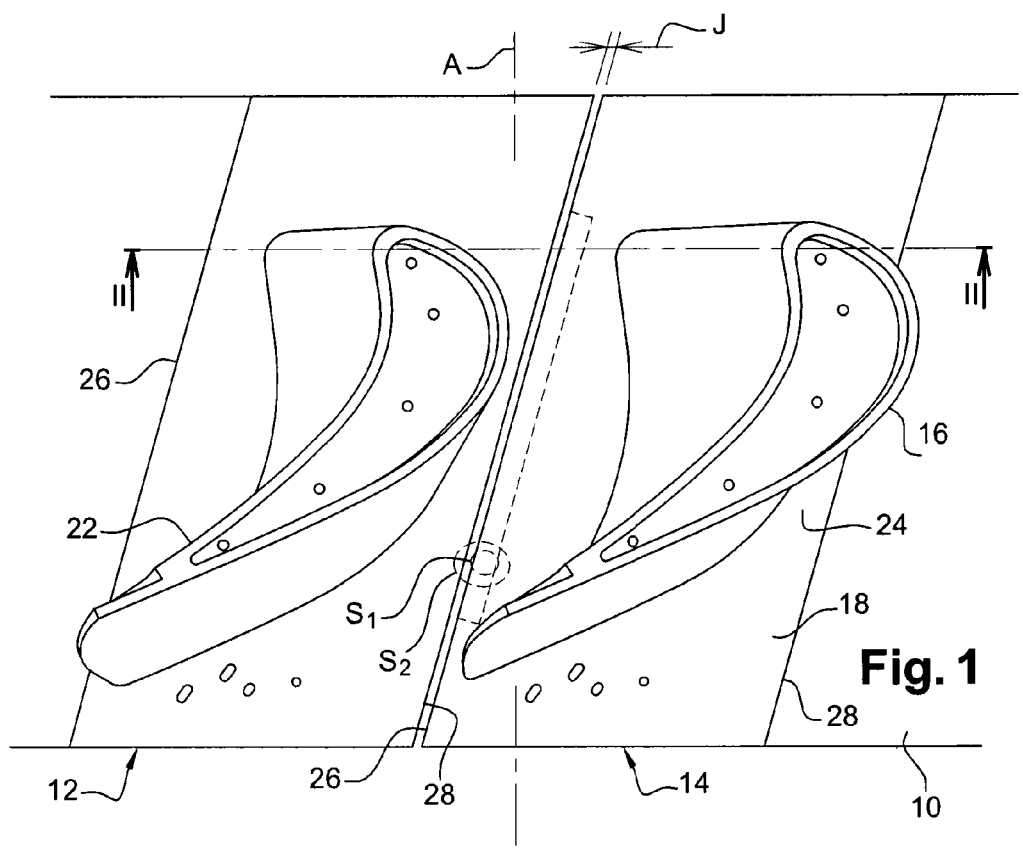
FIG. 1 is a fragmentary diagrammatic view from above of a wheel of a turbine engine compressor or turbine, and it shows two adjacent blades of the wheel.
Figure 2:
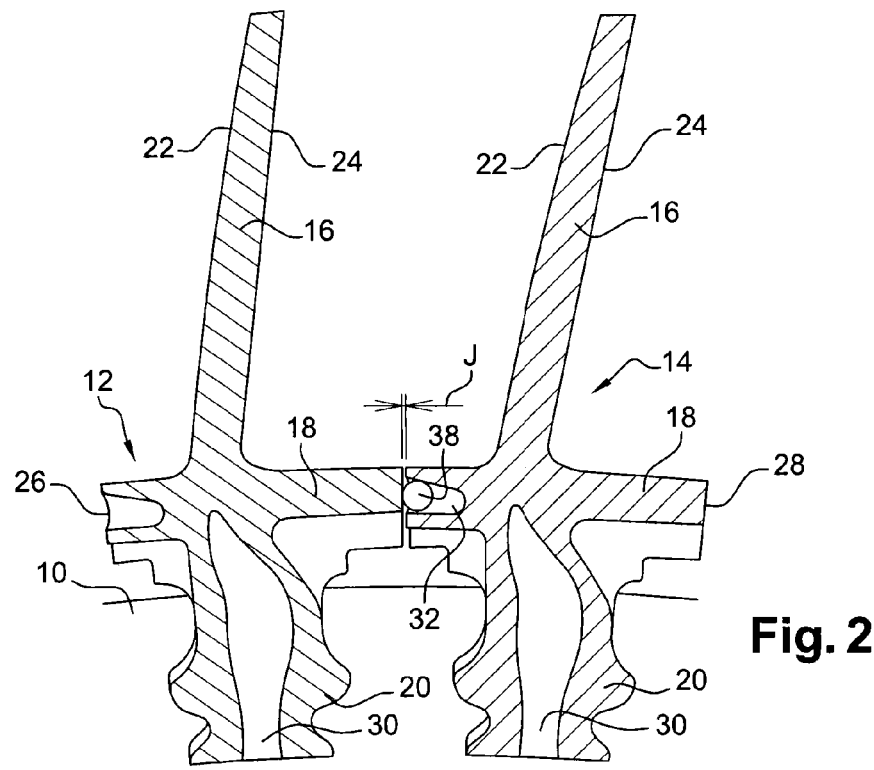
FIG. 2 is a diagrammatic section view on line II-II of FIG. 1.
Figure 3:
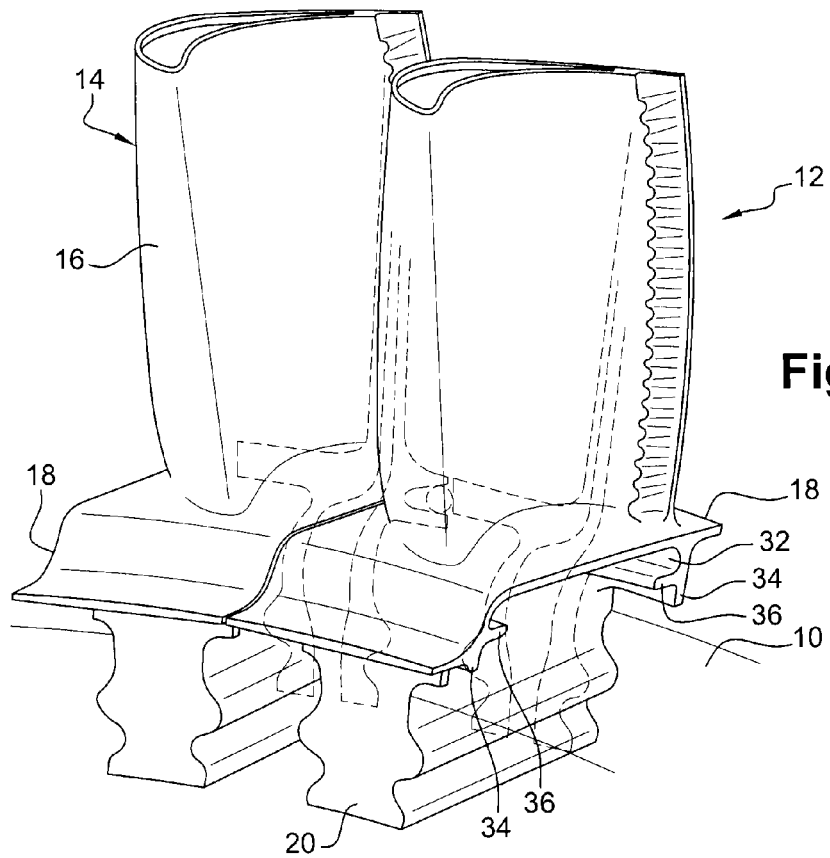
FIG. 3 is a diagrammatic perspective view of the blades of FIG. 1.

Reference is made initially to FIGS. 1 to 3, which are highly diagrammatic and fragmentary views of a compressor or turbine wheel of a turbine engine such as an airplane turboprop or turbojet, the wheel comprising a disk 10 having blades 12, 14 at its periphery, with only two of them being shown in the drawings.

Each blade 12, 14 comprises an airfoil 16 connected by a platform 18 to a root 20 that presents a section of Christmas-tree shape in the example shown. The root 20 of each blade is engaged in a slot (not shown) of complementary shape in the periphery of the disk 10.

The airfoil 16 of each blade has a pressure side 22 and a suction side 24 that are connected together at an upstream end by a leading edge and at a downstream end by a trailing edge, where "leading" and "trailing" are relative to the flow of gas through the compressor or the turbine.

The platform 18 of each blade is generally in the form of a parallelepiped having two straight side edges 26 and 28 that are parallel and inclined relative to the longitudinal axis A of the wheel. When these side edges are parallel to the longitudinal axes of the above-mentioned slots in the disk, the blades may be mounted on the wheel and removed from the wheel independently of one another.

In the assembled position shown in FIGS. 1 to 3, the side edge 26 of the platform 18 of one blade 14 faces the side edge 28 of the platform 18 of an adjacent blade 12 and is spaced apart from said edge by a small amount of clearance J in the circumferential direction, which clearance is of the order of a few tenths of a millimeter.

The roots 20 of the blades include internal channels 30 (FIG. 2) for passing cooling air that is fed to means for cooling the airfoils. Some of these channels open out into the sides of the roots, radially on the inside the platforms 18 of the blades, in order to feed cooling air to the inter-blade spaces situated radially on the inside of the platforms.

In order to avoid this air passing through the above-mentioned clearance J, it is known to mount a sealing system between the platforms 18 of two adjacent blades 12, 14.

Figure 5:
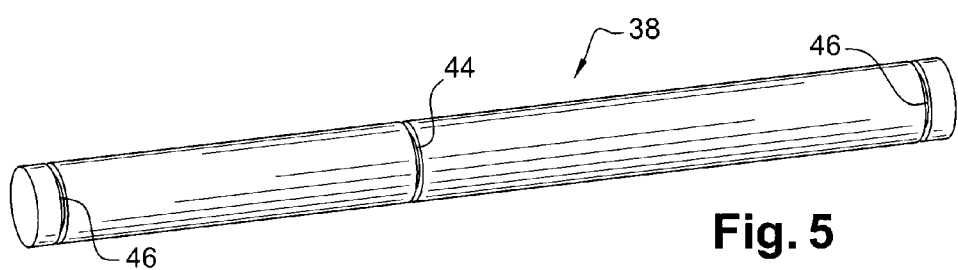
FIG. 5 is a diagrammatic perspective view of the insert of the invention.

The present invention proposes a sealing system, as shown in FIG. 5, that comprises inserts 38 of elongate cylindrical shape, each of which is designed to bear in operation against surfaces of the side edges 26, 28 of the platforms 18 of two consecutive blades 12, 14, and each of which includes means for controlled and localized cooling of the platforms, together with wear indicators.

The position of a cylindrical insert 38 is shown diagrammatically in FIG. 1. The side edge 26 of the platform 18 that extends beside the pressure side 22 of the airfoil 16 of the blade 14 has a longitudinal cavity 32 for housing the insert.

As can be seen in FIG. 3, this cavity 32 is defined radially on the outside by the platform 18 of the blade, upstream and downstream by transverse reinforcing ribs 34 that extend perpendicularly to the platform and to the root of the blade, and radially on the inside by rims 36 that extend from each rib 34 towards the opposite rib, in a direction parallel to the platform.

These rims 36 extend only along end portions of the insert 38, so the insert is supported only via its end portions when the engine is stopped.

Figure 4:
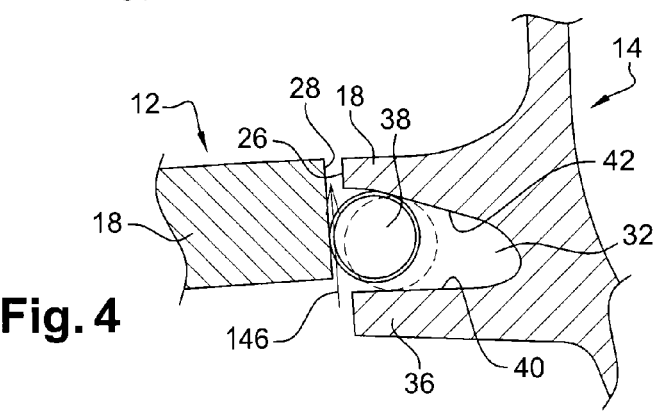
FIG. 4 is a view on a larger scale of a portion of FIG. 2.

The cavity 32 of the insert housing presents a section that is substantially U-shaped or V-shaped at its longitudinal ends, with the open side of the U- or V-shape facing towards the adjacent blade (FIG. 4).

The radially outer surface 40 of the above-mentioned rim 36 defines the radially inner side surface of the cavity 32, and the radially inner surface 42 of the platform 18 defines the radially outer side surface of the cavity 32. This side surface 42 is inclined radially towards the outside beside the adjacent blade (FIG. 4).

The height (or radial dimension) and the depth (or circumferential direction) of the cavity 32 are greater than the diameter of the insert 38 so that the insert can be fully engaged in the cavity 32 in a rest position, as shown diagrammatically by dashed lines in FIG. 4, and it therefore does not impede mounting the blades 12, 14 on the disk 10.

While the engine is in operation, the insert 38 is subjected to centrifugal forces that urge it radially outwards. The insert 38 then slides over the inclined side surface 42 of the cavity 32 and comes to bear against the facing side edge 28 of the platform 18 of the adjacent blade 12, as shown in continuous lines in FIG. 4.

In this operating position, the insert 38 bears against surfaces of the side edges 26, 28 of platforms 18 of adjacent blades 12, 14 and thus provides sealing between those platforms.

According to another characteristic of the invention, the insert 38 has at least one outer annular groove 44 in its outer cylindrical surface for passing cooling air (FIG. 5). When the insert is bearing in operation against the above-mentioned edge 28 of the platform of the adjacent blade, cooling air can pass from the inter-blade space situated radially on the inside of the platforms 18 to the side edges of the platforms of the blades, in order to cool them (arrow 146 in FIG. 4).

The groove(s) is/are positioned on the insert as a function of the zones of the side edges 26, 28 of the platforms 18 that need cooling.

In the example shown in FIG. 1, the groove 44 is situated close to the downstream end of the insert 38. The air that passes radially from the inside towards the outside through this groove 44 serves to cool the temperature of the platform 18 by about 30° C. over a circular zone S1 that is situated in register with the groove of the insert and that presents an area that is substantially equal to the section of the insert, and reduces the temperature of the platform by about 10° over an annular zone S2 extending around the zone S1.

In the example of FIG. 5, the insert 38 of the invention also has a wear indicator at each of its ends, each wear indicator comprising an annular score 46 formed in the outer cylindrical surface of the insert.

As explained above, these wear indicators enable an operator to act, during a maintenance operation, to determine whether the insert is too worn and needs to be changed. The dimensions of the score, and in particular its depth, are thus determined as a function of the acceptable level of wear for the insert.

The insert may be made of metal alloy (e.g. based on nickel) or of a ceramic matrix composite.

In a particular embodiment of the invention, the insert is of the type shown in FIG. 5 and has a length of about 31 mm, and a diameter of about 2.6 mm. It has an annular groove having a width of about 0.5 mm and a depth of about 0.6 mm, which groove is located at a distance of about 17.5 mm from one of its ends. It has an annular score constituting a wear indicator at about 0.8 mm to 1 mm from each of its ends, each of these scores having a width of about 0.2 mm and a depth of about 0.2 mm.

The invention claimed is:

1. A turbine or compressor wheel for a turbine engine, comprising:
    inter-blade sealing means comprising inserts engaged in longitudinal cavities in side edges of platforms of blades and bearing in operation against facing side edges of platforms of adjacent blades, each insert being in a form of an elongate cylinder and including at least one annular groove in an outer cylindrical surface thereof for passing air for cooling the platforms of the blades,
    wherein the inserts include at least one annular score in the outer cylindrical surface forming a wear indicator, a depth of the annular score being less than a depth of the annular groove for passing cooling air, and
    wherein each insert is cylindrical in shape between a first end and a second end of the respective insert, and the at least one annular groove and the at least one annular score are both formed around the entire outer cylindrical surface of the respective insert.

2. A wheel according to claim 1, wherein each insert includes two annular scores disposed in a vicinity of each end of the insert.

3. A wheel according to claim 1, wherein each insert includes one, two, or three annular grooves for passing platform cooling air.

4. A wheel according to claim 1, wherein each insert has a diameter of about 2 mm to 3 mm and a length of about 20 mm to 40 mm.

5. A wheel according to claim 4, wherein each annular groove for passing platform cooling air has a width of about 0.5 mm and a depth of about 0.6 mm.

6. A wheel according to claim 4, wherein each annular score forming a wear indicator has a width of about 0.2 mm and a depth of about 0.2 mm.

7. A wheel according to claim 1, wherein each insert is made of a metal alloy, of a superalloy, or of a ceramic matrix composite material.

8. A wheel according to claim 1, further comprising a disk carrying the blades, each blade having a root engaged in a slot of complementary shape in a periphery of the disk, and a platform that connects the root to an airfoil of the blade and that includes two substantially parallel side edges,
    wherein the side edge of the platform extending beside a pressure side of the airfoil of each blade includes a longitudinal cavity for receiving an insert.

9. A wheel according to claim 8, wherein the cavity for receiving the sealing means has a U-shaped or V-shaped section at longitudinal ends thereof, an open side of the U- or V-shaped section facing towards the adjacent blade, a radially inner side wall of the cavity extending substantially parallel to the platform and a radially outer side wall of the cavity being inclined relative to the platform and extending radially outwards beside the adjacent blade.

* * * * *